United States Patent [19]

Catanzarite

[11] Patent Number: 5,712,783
[45] Date of Patent: Jan. 27, 1998

[54] CONTROL METHOD FOR SEMI-ACTIVE DAMPER

[75] Inventor: David M. Catanzarite, Erie, Pa.

[73] Assignee: Lord Corporation, Erie, Pa.

[21] Appl. No.: 639,139

[22] Filed: Apr. 26, 1996

[51] Int. Cl.$^6$ .................... B60G 17/015; B60N 2/50
[52] U.S. Cl. .................... 364/424.046; 280/707;
   280/840; 248/562; 248/566; 180/109; 180/378
[58] Field of Search ............... 364/424.046, 424.047,
   364/424.048; 280/707, 840, 6.1, 6.11; 188/378,
   109, 299; 248/562, 566, 550; 296/65.1

[56] References Cited

U.S. PATENT DOCUMENTS

| | | | |
|---|---|---|---|
| 3,701,499 | 10/1972 | Schubert et al. | 244/17.27 |
| 3,807,678 | 4/1974 | Karnopp et al. | 248/358 R |
| 4,953,089 | 8/1990 | Wolfe | 364/424.05 |
| 5,199,737 | 4/1993 | Huang | 280/707 |
| 5,276,622 | 1/1994 | Miller et al. | 364/424.046 |
| 5,276,623 | 1/1994 | Wolfe | 364/424.05 |
| 5,313,390 | 5/1994 | Schramm et al. | 364/424.05 |
| 5,322,320 | 6/1994 | Sahashi et al. | 280/707 |
| 5,346,242 | 9/1994 | Karnopp | 280/707 |
| 5,358,305 | 10/1994 | Kaneko et al. | 280/707 |
| 5,383,124 | 1/1995 | Kunz et al. | 364/424.05 |
| 5,388,658 | 2/1995 | Ando et al. | 180/197 |
| 5,390,121 | 2/1995 | Wolfe | 364/424.05 |
| 5,393,087 | 2/1995 | Taniguchi et al. | 280/707 |
| 5,422,810 | 6/1995 | Brunning et al. | 364/424.05 |
| 5,488,562 | 1/1996 | Otterbein et al. | 364/424.05 |
| 5,497,324 | 3/1996 | Henry et al. | 364/424.05 |
| 5,582,385 | 12/1996 | Boyle et al. | 248/550 |

*Primary Examiner*—Kevin J. Teska
*Assistant Examiner*—Tan Nguyen
*Attorney, Agent, or Firm*—R. K. Thomson; R. S. Wayland; J. W. Wright

[57] ABSTRACT

A semi-active control method for a controllable fluid damper used in seat supports. The present method filters a relative displacement signal phase shifting the relative displacement sine wave by an angle from greater than 0° through an angle less than 90° to get a relative rate. The sign of the relative rate is compared to that of an absolute velocity curve obtained by integrating the absolute acceleration value obtained by an accelerometer attached to the controlled seat. If the signs are the same, the output to the damper is set to a minimum; if the signs are different, the value is set at the absolute velocity multiplied by an input gain. Endstop limits can be implemented with this control method.

14 Claims, 6 Drawing Sheets

FLOWCHART OF MODIFIED RATE CONTROL

CONTROL METHOD FOR SEMI-ACTIVE DAMPER

BACKGROUND AND SUMMARY OF THE INVENTION

The present invention is directed to the field of controllable damping suspensions. More particularly, the present invention is directed to an improved method for dynamically controlling a semi-active damper system with a modified-skyhook control. This invention is related to the invention described and claimed in U.S. patent application Ser. No. 08/534,078 entitled "Controllable Seat Damper System and Control Method Therefor" which is hereby incorporated by reference. Although the control method of the present invention is described herein in conjunction with a seat damper, it will be appreciated that the present method can be equally effective when used in controlling suspension damper systems, engine mounts, etc.

Various seat damper systems have been proposed for use in Class 8 trucks, off-highway equipment, boat seats, automotive and aerospace applications. Most of the systems used to date are passive, i.e., have a coil or air spring with fixed operational characteristics. A compromise must be made in such systems between providing the desired control for high amplitude vibration and providing the desired isolation from high frequency disturbances. Such tuned passive systems can result in poor ride conditions which produce discomfort for the operator and, in some cases, can lead to loss of control of the vehicle.

One controllable seat damper known in the art is described and claimed in U.S. Pat. No. 5,358,305 issued to Kaneko et al. Kaneko et al. employs a hydraulic seat damper with a controllable valve which can be switched between a closed and an open position, limiting the adjustment to a single hard and a single soft position.

The use of skyhook control is known in other environments such as in controlling automotive suspension systems. Karnopp et al. (U.S. Pat. No. 3,807,678) discloses the original use of skyhook control with a semi-active damper. Karnopp (U.S. Pat. No. 5,346,242) teaches the use of skyhook damping to control an automotive load-leveling suspension. An accelerometer provides an absolute acceleration reading that is integrated to provide an absolute velocity value. The absolute velocity and a relative position value sensed by a second sensor on the unsprung mass are fed to the controller to provide a control signal for the variable damper in this fully active system.

The commonly assigned Wolfe patents (U.S. Pat. Nos. 5,390,121; 5,276,623; and 4,953,089) teach, respectively, the use of manually adjustable settings for differing ride feel, the use of null bands for damper control, and the use of a digital filter to remove a DC component of a velocity signal. Miller et al. discloses the use of end-stop control in damper systems. Each of these four patents in incorporated herein by reference.

Schramm et al. (U.S. Pat. No. 5,313,390) discloses the use of a skyhook damper employing an absolute acceleration signal for the vehicle and a relative position signal from the piston. The relative position signal is differentiated to produce a relative velocity signal which is fed to the Karnopp circuit with the absolute velocity signal to produce a force control reference signal for the damper.

Huang (U.S. Pat. No. 5,199,737) teaches the use of a damper which can be controlled in accordance with the skyhook algorithm or Huang's own algorithm. The system produces a filtered absolute acceleration and a relative velocity that are used to produce the control signal output.

Sahashi et al. (U.S. Pat. No. 5,322,320) discloses a suspension control employing a sprung mass acceleration sensor and a relative displacement sensor. The reading from the acceleration sensor is integrated to produce an absolute velocity for the sprung mass, while the relative displacement value is differentiated to produce a relative velocity. These two values are compared in the controller to provide the output control signal. Sahashi et al. also teach the use of band pass filters to determine high and low frequency components of the disturbance vibration signal.

The present control method is a modified-skyhook control method. Normally, skyhook describes the optimum desired control with the actual performance of a semi-active system being something less than the optimum. Further, implementation of skyhook control in a semi-active system can require expensive components including sophisticated controllers, filters, sensors and related hardware. The present control method enables simple, inexpensive hardware to be used and actually outperforms skyhook theoretical control, previously unheard of in a semi-active system. End stop limits can be used to increase the damping force when the damper is about to bottom (or top) out thereby avoiding the harsh feel of an end stop collision.

The present method comprises the steps of sensing a relative displacement of said damper system; feeding said relative displacement to a controller; sensing an absolute acceleration of said damper system; feeding said absolute acceleration to said controller; processing said relative displacement through a filter within said controller to determine a displacement rate of raid damper system, said processing including phase shifting said relative displacement through an angle greater than 0° and less than 90°; integrating said absolute acceleration to find an absolute velocity; subtracting a steady-state component from each of said displacement rate and absolute velocity; determining whether said displacement rate and absolute velocity are each positive or negative; comparing a sign of said displacement rate with a sign of said absolute velocity; deriving an output signal equal to a minimum value if the compared signs are the same and to a value proportional to said absolute velocity if the compared signs are opposed; and, feeding said output control signal to a controllable damper to adjust its force output setting to an appropriate value. The precise amount of the phase shift to optimize performance of the control method will depend on the characteristics of the seating system and be determined through trial and error.

Various other features, advantages and characteristics of the device and control method of the present invention will become apparent after a reading of the following detailed description and addended claims.

BRIEF DESCRIPTION OF THE DRAWINGS

This section describes the drawings.

DETAILED DESCRIPTION OF THE PREFERRED EMBODIMENTS

Figure 1:
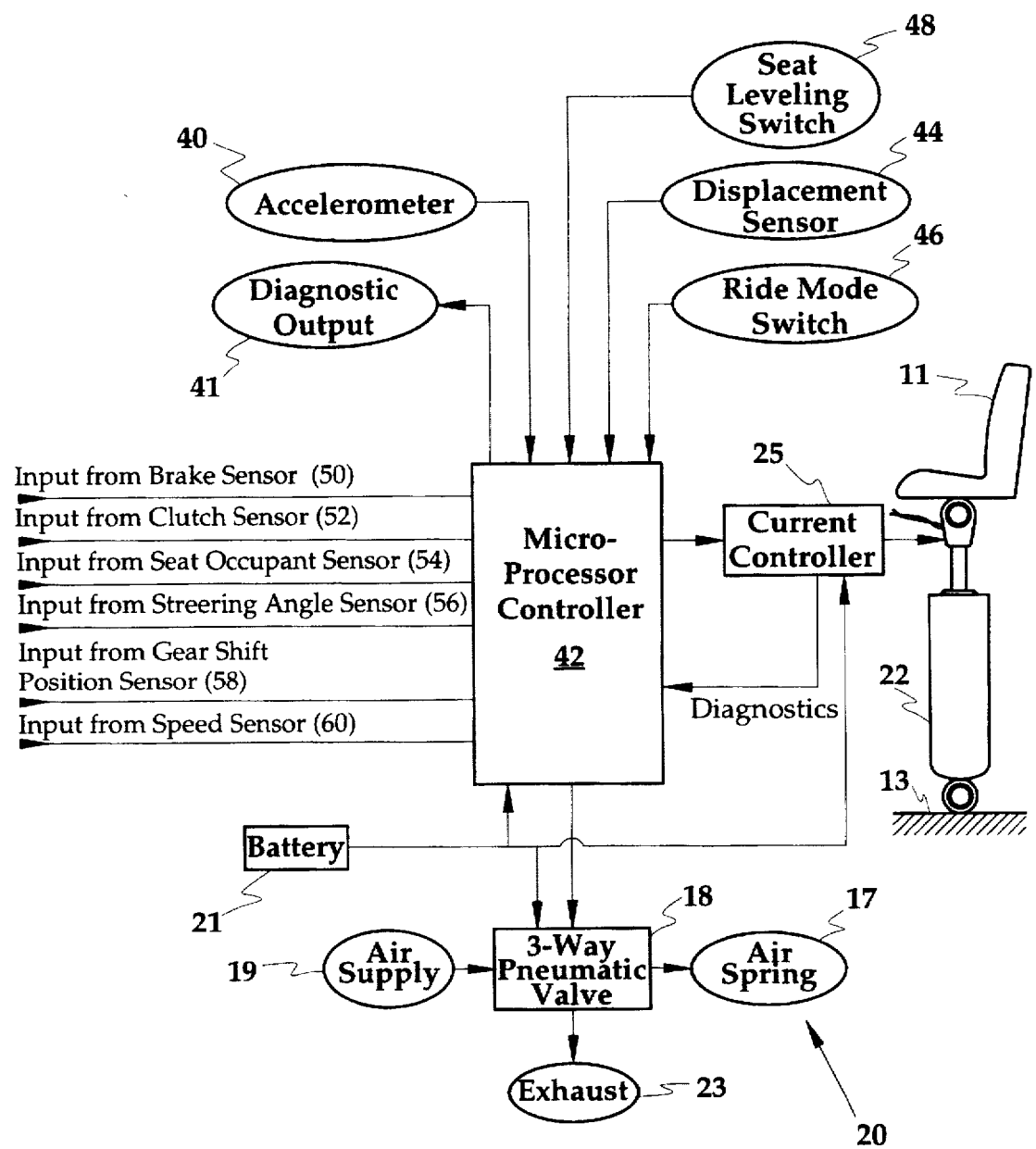
FIG. 1 is a schematic depiction of a seat damper system in which the current method can be implemented.

A controllable damper system of the type with which the control method of the present invention can be seen in FIG. 1 generally at 20. This system 20 closely parallels that described and claimed in copending U.S. patent application Ser. No. 08/534,078. System 20 includes a controllable fluid damper 22, preferably a magnetorheological fluid damper, attached between the floor of a vehicle compartment 13 and the bottom of a seat 11. The seat suspension system includes an air spring 17 which is similarly connected between the seat and floor, the stiffness of air spring 17 being adjusted by connecting it to air supply 19 or exhaust vent 23 by a 3-way pneumatic valve 18. The automotive battery 21 can provide power to adjust the position of valve 18 and to the current controller 25 which adjusts the strength of the magnetic field in damper 22.

Two sensors provide essential information to the microprocessor controller 42: accelerometer 40 which is attached to the lower surface of the seat and the displacement sensor 44 which may be attached to any number of positions with respect to the support structure. If the support is a scissors mount, the sensor 44 will typically be attached to the cross-over junction. If a parallel linkage mount is used, the sensor 44 can be floor mounted and a finger extending from the parallel linkage arms can provide the sensor with a relative position signal. The sensor 44 does not care from where it gets its displacement input as long as it obtains a signal that is proportional to the relative displacement across the suspension. This provides considerable flexibility to the system and enables the seat damper system to be used with virtually any seat configuration and, as previously mentioned, to use low-cost hardware. Accelerometer 40 is a conventional, off-the-shelf, low-cost accelerometer and provides a signal proportional to the acceleration of the sprung mass. System diagnostics can be output at a port 41 from controller 42.

Additional optional signals can be provided such as from an adjustable ride mode switch 46, a seat leveling switch 48 that maintains the seat at a fixed height, input from a brake sensor 50, clutch sensor 52, seat occupant sensor 54, steering angle sensor 56, gearshift position sensor 58, and/or a speed sensor 60, as previously described in the aforementioned copending application. However, only the inputs from the accelerometer 40 and the displacement sensor 44 are essential for operation of the disclosed control method.

Figure 2:
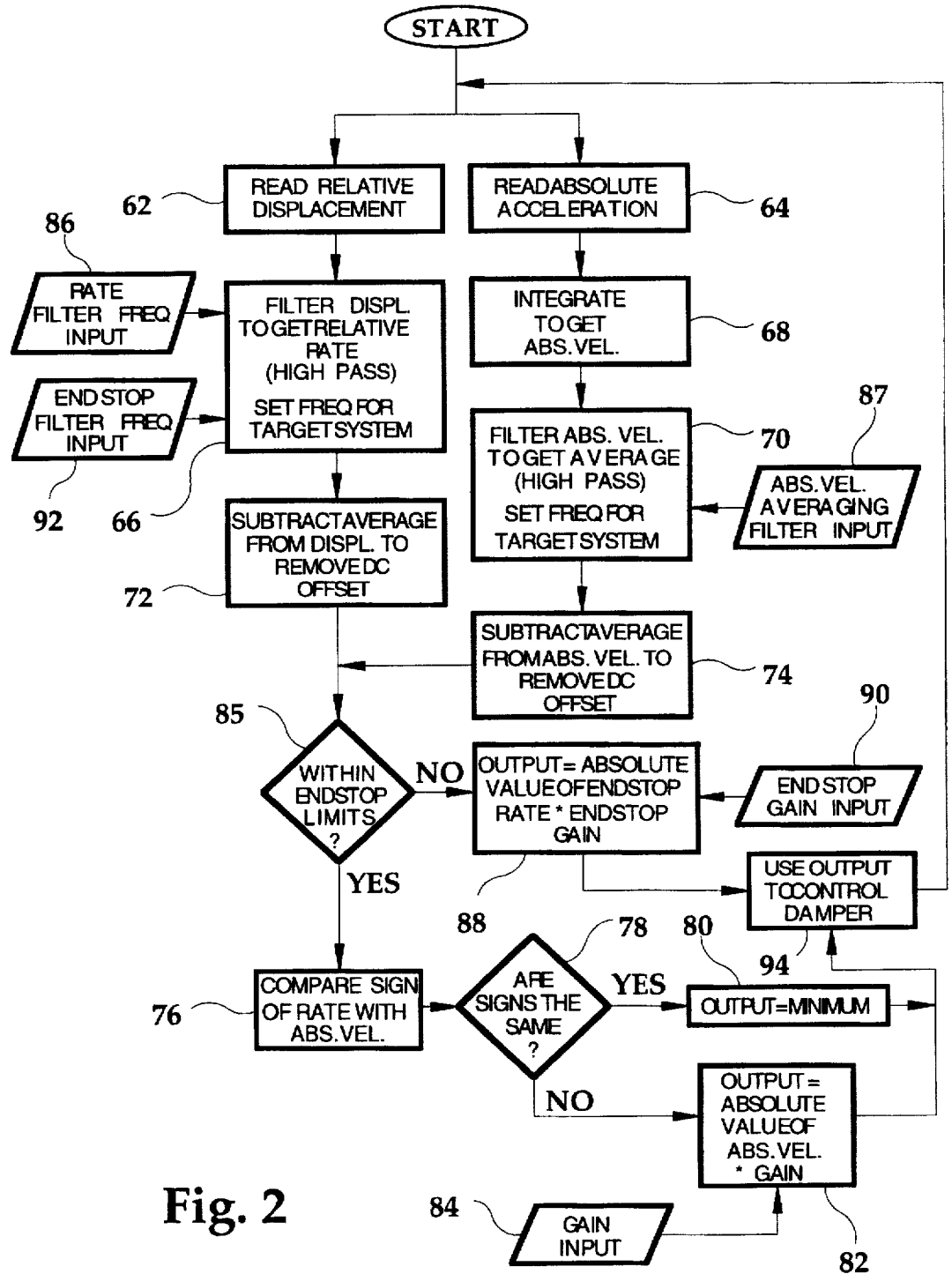
FIG. 2 is a flow chart depicting the steps of the present method.

The steps of the present method, alternatively known as "modified-rate control" and "modified-skyhook control", are shown in FIG. 2. After system startup, which will generally be concurrent with ignition, sensor 44 (FIG. 1) reads relative displacement, as shown in block 62 and feeds it to the controller 42. Concurrently, accelerometer 40 is reading absolute acceleration of the seat 11, block 64, and feeding the value to controller 42. Controller 42 filters the relative displacement with a low frequency, high pass filter to produce a relative rate in block 66. The filter actually phase shifts the relative displacement reading by an amount greater than 0° and less than 90°. The results depicted in the curves of FIG. 3a have been achieved using a single pole filter. It will be appreciated that a multiple-pole filter may produce further enhanced results. Differentiation of the relative displacement to produce a relative velocity would result in a 90° phase shift. This is the value normally used with a conventional skyhook control. However, the adjustment of the phase shift by a variable amount in accordance with the present invention has resulted in an unexpectedly efficient damping method that outperforms the conventional skyhook method.

The controller 42 also integrates absolute acceleration to obtain absolute velocity in block 68 then high pass falters the absolute velocity to obtain the DC average component of velocity in block 70. The DC component may result from such things as temperature changes or parts tolerances, for example. In blocks 72 and 74 the average components of relative rate and absolute velocity, respectively, are subtracted from their signals. This eliminates the tendency to over-correct the current applied to the magnetic circuit and yet, permits the use of low cost system components (i.e., more sophisticated equipment is not needed to perform this adjustment function).

The adjusted relative rate and absolute velocity are then compared in block 76 to determine if the signs are the same (i.e., are the values of the sine curves for the absolute velocity and the phase shifted relative rate both positive/negative?). If the answer is yes, as shown in logic block 78 the output to the damper is set to a minimum value in block 80. This is the point at which an active system would draw on its external power source to input added control. Since a semi-active system is unable to add positive force (i.e., can merely damp, or add "negative" force), the damper is simply turned to its lowest setting, or off position. If the signs are different, then the output to the controllable damper 22 is routed via logic block 78 to block 82 where the output signal is set to be the product of the absolute value of the absolute velocity times a set gain. Absolute velocity in the extension direction is considered negative and, so the controller will compute its positive equivalent to determine the magnitude of the control force, while absolute velocity in the compressive direction is already positive such that no conversion is necessary. The polarity of positive and negative for relative velocity is reversed with extension being considered positive. It will be understood that the use of the absolute value eliminates the need for a double directional driver. In some applications using the controllable fluid damper 22 disclosed herein, it may prove beneficial to utilize the unaltered signal to develop the output signal; for example, using the unaltered signal would reverse the polarity on the magnetic field which should have the effect of lowering the residual magnetic field.

The gain can be input through block 84 and will typically be preset to a particular value for a particular seating system. The frequency input 86 for the rate filter can be continuously varied between a value greater than 0° and less than 90° which is input into block 66. This value will also, typically, be preset for the system before installation. However, the value can be tweaked to improve system performance, if necessary. The same is true for the gain input through block 84 and the averaging filter input 87 for absolute velocity input to block 70.

Figure 3A:
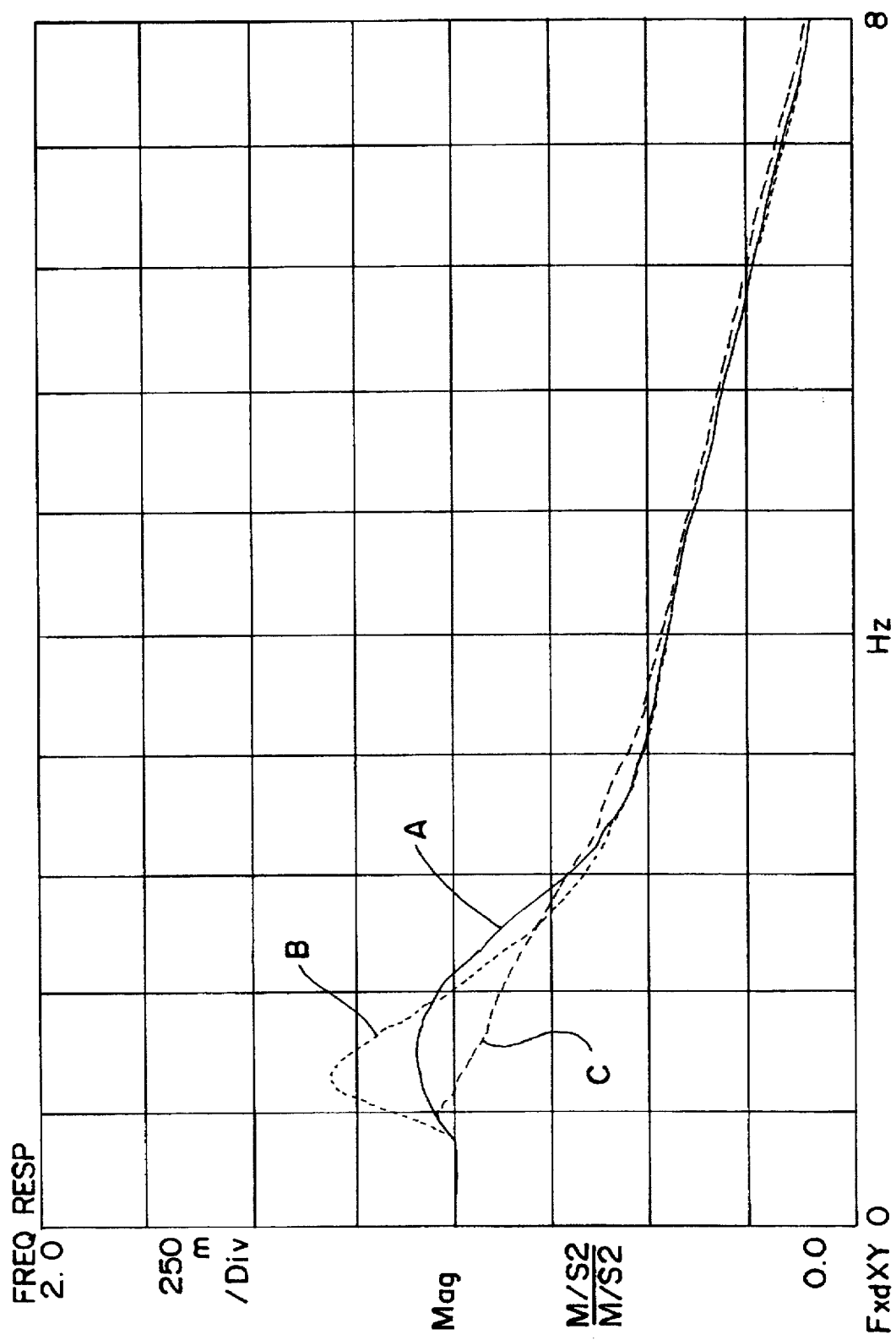
FIG. 3a is a plot comparing the performance of the present damper to the ideal skyhook control as used with a particular seat system.
Figure 3B:
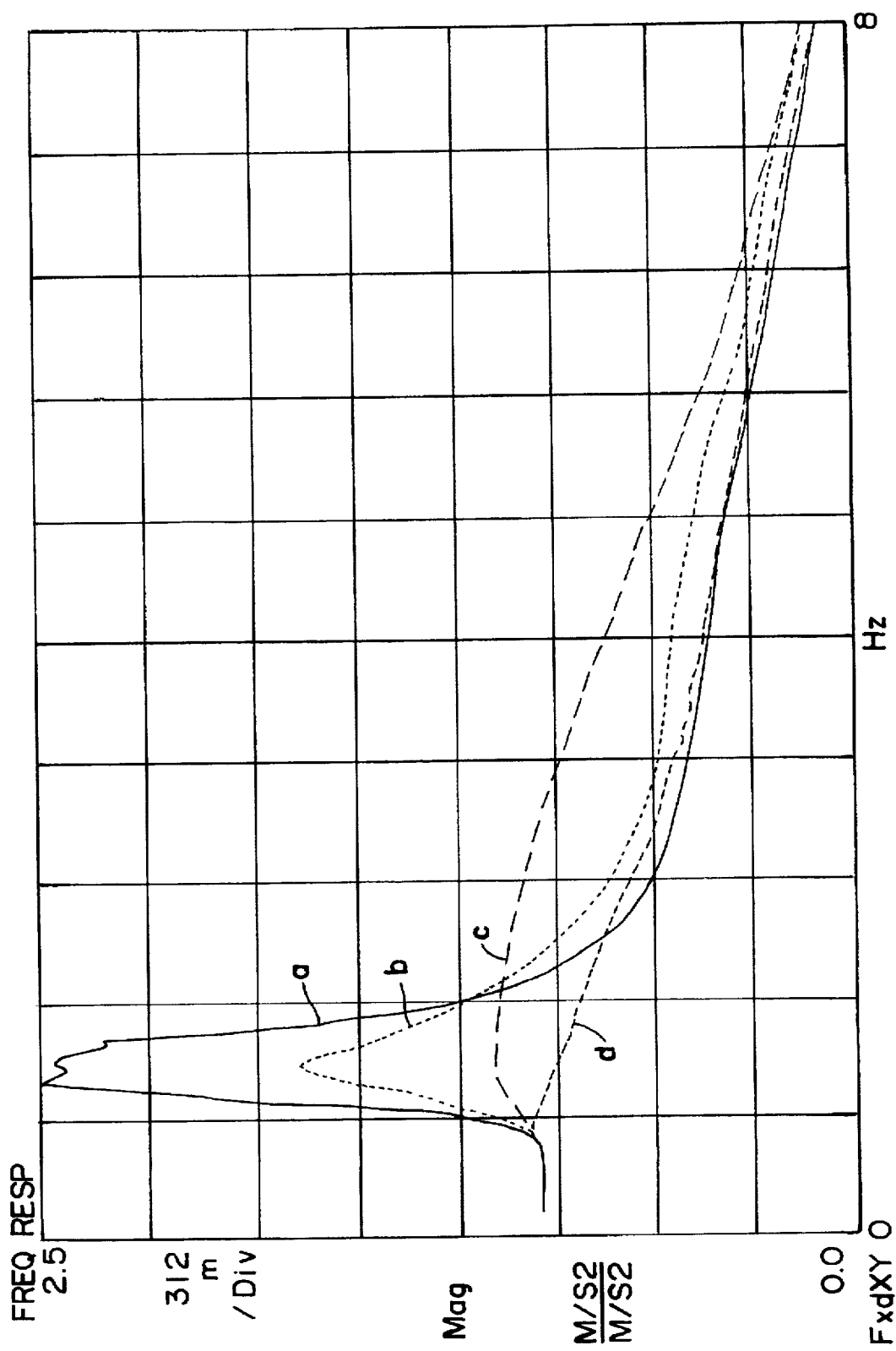
FIG. 3b is a plot comparing the performance of the present damper against several passive dampers.

FIG. 3a is a plot of system performance showing the modified rate control of the present method vs the classic skyhook control for a particular seat configuration. In the control method of the present invention relative displacement was phase shifted by amounts of 50° for curve B and 70° for curve C to obtain a relative rate, with skyhook control being shown in curve A. The phase shift associated with the modified rate control method also shifts the apparent natural frequency of the system to a lower frequency which expands the effective range of damping. Looking at the curves suggests that 50° is past optimum since the peak of curve B occurs at a frequency between those of curves A and C, besides having a magnitude which is greater than the skyhook peak, while that of curve C is much less than that of curve A. Other seating configurations and non-seating applications may necessitate different phase shifts to produce optimum results (i.e., some systems may require a phase shift of, for example 20° or 80°). Indeed, given the wide range of possible uses, certain systems may require a phase shift as little as 1° or as great as 89° to produce optimum isolation. FIG. 3b compares the optimized 70° phase shifted rate (curve d) with damper 22 turned off (curve a), a soft passive damper (curve b), and a firm passive damper (curve c). It is significant to note how much improved the performance of the damper 22 is when used with the present control method (compare curves a and d).

Figure 4A:
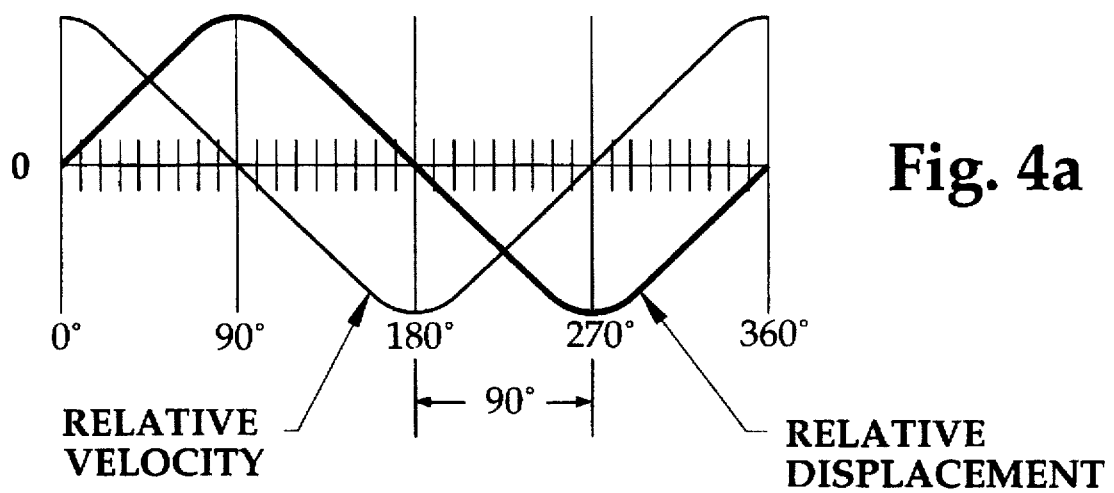
FIG. 4a is a schematic depiction of a typical relative displacement curve with its associated velocity curve resulting from integrating displacement (basic skyhook)
Figure 4B:
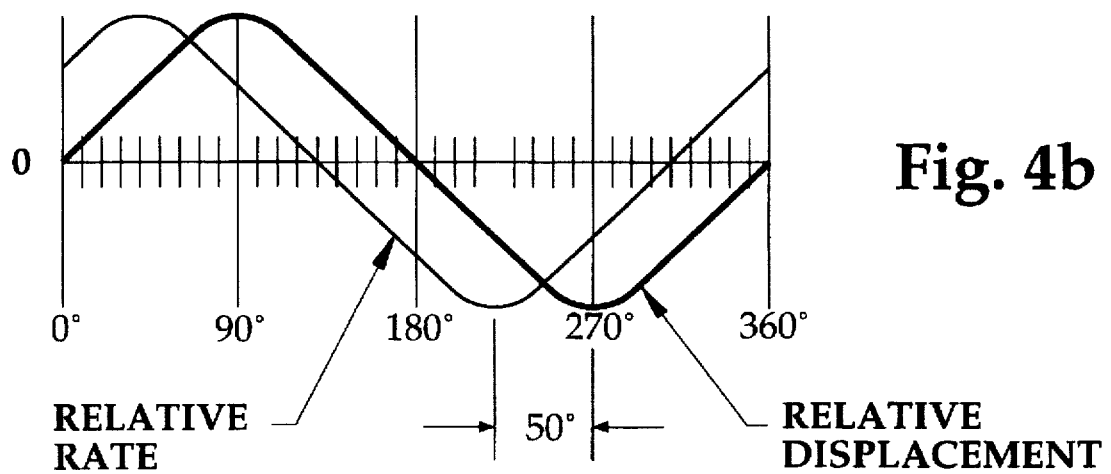
FIG. 4b is a schematic depiction of a typical displacement curve and a relative rate achieved by a 50° phase shift in the method of the present invention.
Figure 4C:
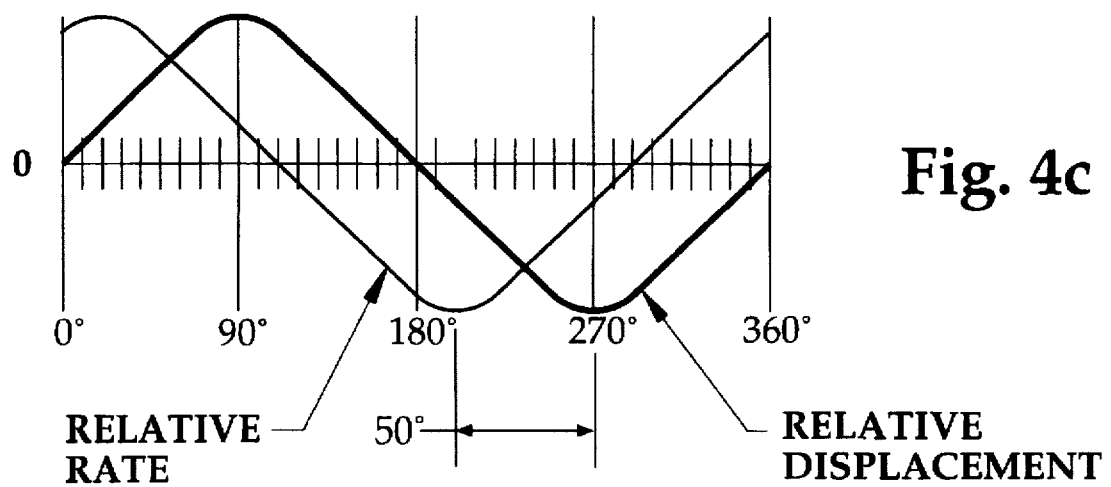
FIG. 4c is a schematic depiction of a typical displacement curve and a relative rate achieved by a 70° phase shift in the method of the present invention.

FIGS. 4a–c show the relative phase shift for each of the FIG. 3a curves A, B and C, respectively. As shown in FIG. 4a, differentiating relative displacement to obtain relative velocity results in a 90° phase shift (leading) of the curve. Curve C, which appears to produce optimum isolation and damping for the particular seat system with which the control method was tested, results from a leading phase shift of 70° (FIG. 4c) while a phase shift of 50° (FIG. 4b) produced an intermediate result (curve B).

Figure 5A:
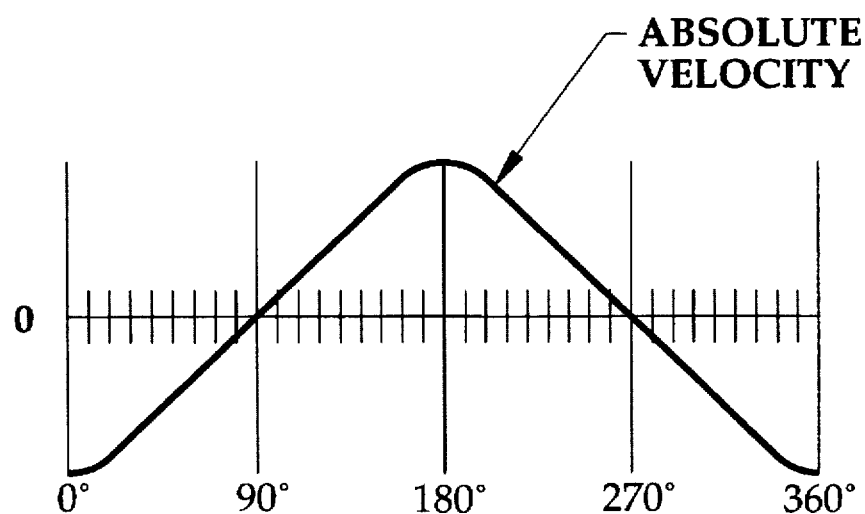
FIG. 5a is a representative absolute velocity curve.
Figure 5B:
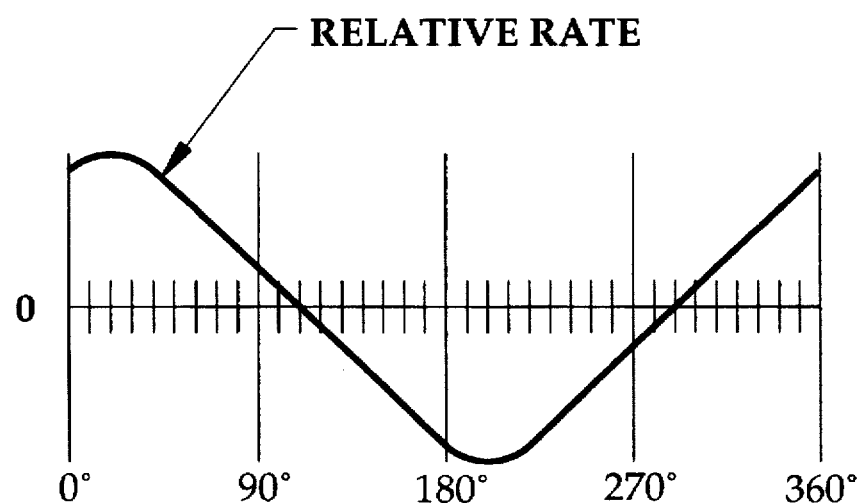
FIG. 5b is a representative relative rate curve.
Figure 5C:
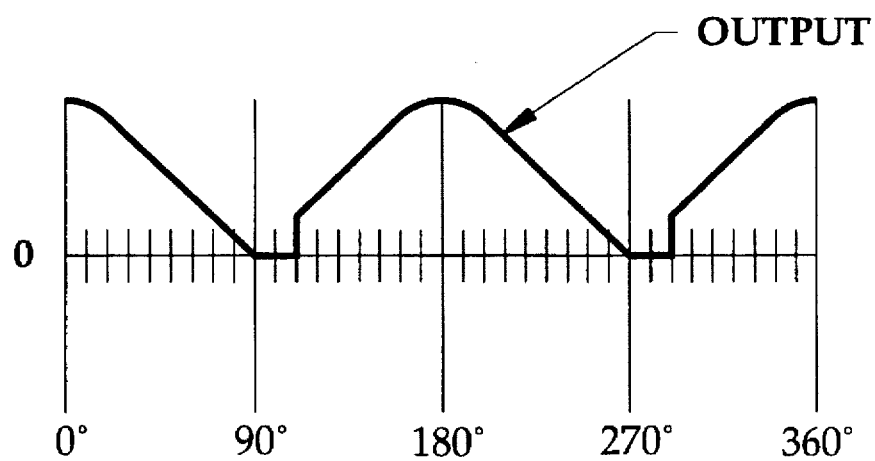
FIG. 5c is a representative output curve.

FIG. 5a shows a representative sample of an absolute velocity curve at a frequency of about 1 Hz. It is inverted relative to FIG. 4a due to the reversal of polarity discussed earlier. FIG. 5b shows an exemplary relative rate curve and FIG. 5c the output showing the on-off cycling and magnitude of the output to the damper. The modified rate control method (FIG. 2) compares the signs of the two curves (block 76) and if the signs are the same, sets the output to zero (as shown from 90°–110° and 270°–290°). The output when the signs are opposed is proportional to the absolute value of the absolute velocity (equal if the gain is set at 1).

What has just been described is the basic modified-rate control method. Should it be desired to provide the seat damper system 20 with endstop control or null bands, then endstop control and/or null bands as described in copending U.S. patent application Ser. No. 08/534,078 can be added. As depicted in FIG. 2, a determination can be made in decision block 85 whether the position of the seat damper is within endstop limits. If yes, the signal is merely passed to block 76 and processing proceeds as before. If not, a higher endstop output will be produced in block 88 as a product of the absolute value of the endstop rate and the endstop gain. The endstop gain input 90, as with the other inputs, is typically preset. In addition, the endstop filter frequency input 92 can be preset in block 66. The output, whether from blocks 80, 82 or 88 is fed to block 94 where the signal is converted to a current which is used to control the magnetic coil of the controllable magnetorheological fluid damper 22. Increasing the current will increase the strength of the magnetic field which will increase the resistance to movement of the fluid increasing the effective damping of seat movement. In the same manner, a null band decision tree can be added as described in the earlier application.

Various changes, alternatives and modifications will be apparent to one of ordinary skill in the art following a reading of the foregoing specification. For example, while the control method of the present invention has been described as used with controllable fluid dampers, it will be readily apparent that this control method could be equally effective when used with conventional electro-mechanical dampers. Further, while it has been indicated that the phase shift is preset at a fixed amount, it would be within the scope of the present invention to vary the amount of the phase shift during operation. For example, the filter could be set to provide a first phase shift to track the best low frequency relative rate in FIG. 3a (curve C) shifting to a superior higher frequency relative rate (curve B) above about 2 Hz (note, each square represents 0.8 Hz). While this may not appear to provide a significant improvement with this particular seat application, other systems may well afford significant differences between the two (or even a higher number) of relative rates. It is intended that all such changes, alternatives and modifications as fall within the scope of the appended claims be considered part of the present invention.

What is claimed is:

1. A control method for implementing skyhook-type control in a controllable damper system, said method comprising the steps of a) determining a relative displacement of said damper system;

b) feeding said relative displacement to a controller;

c) sensing an absolute acceleration of said damper system;

d) feeding said absolute acceleration to said controller;

e) processing said relative displacement through a filter within said controller to determine a displacement rate of said damper system, said processing including phase shifting said relative displacement through an angle greater than 0° and less than 90°;

f) integrating said absolute acceleration to find an absolute velocity;

g) subtracting a steady-state component from each of said displacement rate and absolute velocity;

h) comparing a sign of said displacement rate with a sign of said absolute velocity;

i) deriving an output signal equal to a minimum value if the compared signs are the same and to a value equal to said absolute velocity times a desired gain if the compared signs are opposed;

j) feeding said output control signal to a controllable damper to adjust its force output setting to an appropriate value.

2. The control method of claim 1 further comprising the steps of k) determining if said relative displacement of said damper is within end stop limits;

l) if not, multiplying an alternate output signal by a preset end stop gain to produce an alternate output control signal;

m) feeding said alternate output control signal to said controllable damper to adjust its force output setting to an appropriate higher value to reduce end stop collisions.

3. The control method of claim 2 further comprising the step of setting said preset end stop gain to a desired level to produce the desired damping when implemented.

4. The control method of claim 2 wherein said step of multiplying comprises multiplying said alternate output signal identified as said displacement rate by said end stop gain.

5. The control method of claim 1 wherein said step of processing said relative displacement to obtain said phase shift is accomplished by adjusting an averaging time constant thereby tuning said controller to a particular phase angle and/or desired ride feel.

6. The control method of claim 1 wherein the step of feeding said output control signal includes adjusting a relative strength of an induced field to vary the rheological fluid properties of a controllable fluid in said controllable damper in order to adjust said force output setting.

7. The control method of claim 1 wherein the determining step comprises sensing a relative displacement with a displacement sensor.

8. The control method of claim 1 wherein the determining step comprises sensing a relative velocity with a velocity sensor and integrating to find relative displacement.

9. The control method of claim 1 wherein the determining step comprises sensing an absolute acceleration of a base, comparing said base acceleration to said seat acceleration to determine relative acceleration, integrating said relative acceleration twice to produce relative displacement.

10. The control method of claim 1 wherein the determining step comprises sensing an absolute acceleration of a base, comparing said base acceleration to said seat acceleration to determine relative acceleration, integrating said relative acceleration once and processing said signal through a low pass filter to produce said relative rate.

11. The control method of claim 1 further comprising comparing said relative rate to a preset null band to determine if said rate falls within said null band, setting an output control signal to a minimum value if said relative rate is within said null band and reverting to normal signal processing if it is not.

12. The control method of claim 11 further comprising comparing said absolute velocity to a preset null band to determine if said absolute velocity falls within said null band, setting an output control signal to a minimum value if said absolute velocity is within said null band and reverting to normal signal processing if it is not.

13. The control method of claim 1 wherein said processing step further comprises hybriding the relative rate from a plurality of different relative rates which have been phase-shifted differing amounts.

14. A control method for implementing skyhook-type control in a damper system which is used to damp movement of a damped member, said method comprising the steps of a) determining a relative displacement of said damper;

b) feeding said relative displacement to a controller;

c) determining a value for absolute velocity of said damped member;

d) feeding said absolute velocity to said controller;

e) processing said relative displacement through a filter within said controller to determine a displacement rate of said damper system, said processing including phase shifting said relative displacement through an angle greater than 0° and less than 90°;

f) comparing a sign of said displacement rate with a sign of said absolute velocity;

g) deriving an output signal equal to a minimum value if the compared signs are the same and to a value proportional to said absolute velocity if the compared signs are opposed;

h) feeding said output control signal to a damper to adjust its force output setting to an appropriate value to damp motion of said damped member.

* * * * *